United States Patent
Lee et al.

(10) Patent No.: US 8,351,739 B2
(45) Date of Patent: Jan. 8, 2013

(54) DEVICE FOR REMOVING MOSQUITO NOISE AND ASSOCIATED METHOD

(75) Inventors: Wei-Kuo Lee, Hsinchu Hsien (TW); Shih-Chang Lai, Hsin-Chu (TW)

(73) Assignee: MStar Semiconductors, Inc., Hsinchu Hsien (TW)

( * ) Notice: Subject to any disclaimer, the term of this patent is extended or adjusted under 35 U.S.C. 154(b) by 448 days.

(21) Appl. No.: 12/725,089

(22) Filed: Mar. 16, 2010

(65) Prior Publication Data

US 2010/0239181 A1 Sep. 23, 2010

(30) Foreign Application Priority Data

Mar. 17, 2009 (TW) .............................. 98108520 A

(51) Int. Cl.
*G06K 9/40* (2006.01)
*H04N 1/407* (2006.01)

(52) U.S. Cl. .................... 382/275; 382/264; 358/3.26

(58) Field of Classification Search .................. 382/264, 382/266, 268, 269, 274–275, 305, 312; 358/1.16, 358/3.23, 3.26, 3.27; 375/240.27, 254
See application file for complete search history.

(56) References Cited

U.S. PATENT DOCUMENTS

| | | | |
|---|---|---|---|
| 7,272,265 B2 * | 9/2007 | Kouri et al. | 382/260 |
| 7,545,988 B2 * | 6/2009 | Meeker | 382/232 |
| 7,548,270 B2 * | 6/2009 | Kong et al. | 348/366 |
| 7,953,154 B2 * | 5/2011 | Murakami et al. | 375/240.16 |

* cited by examiner

*Primary Examiner* — Kanjibhai Patel
(74) *Attorney, Agent, or Firm* — WPAT PC; Justin King

(57) ABSTRACT

A device for removing mosquito noise and associated method is provided to adaptively determine a proper strength for removing the mosquito noise according to image complexities, thereby removing the noise while maintaining the quality of image details. The device includes a buffer, a lookup table, and a strength determining unit. The buffer stores a pixel matrix having a target pixel. The lookup table stores a plurality of coefficients. The strength determining unit, coupled to the buffer and the lookup table, detects the image complexities of the pixel matrix and looks up the lookup table according to the image complexities of the pixel matrix, so as to output a strength coefficient for removing the mosquito noise.

17 Claims, 5 Drawing Sheets

DEVICE FOR REMOVING MOSQUITO NOISE AND ASSOCIATED METHOD

CROSS REFERENCE TO RELATED PATENT APPLICATION

This patent application is based on Taiwan, R.O.C. patent application No. 98108520 filed on Mar. 17, 2009.

FIELD OF THE INVENTION

The present invention relates to image processing, and more particularly, to a device for removing mosquito noise and associated method.

BACKGROUND OF THE INVENTION

The common image compression technology loses high frequency components of an image due to a high image compression ratio. And when the image is decompressed, a mosquito noise is incurred in the high frequency area, for example, at an edge of the image as illustrated in FIG. 1. In the prior art, a low-pass filter is utilized to remove the mosquito noise. However, when the strength of the filter is too strong, the image becomes fuzzy and the image details are damaged. Conversely; when the strength of the filter is too weak, the mosquito noise cannot be removed effectively.

SUMMARY OF THE INVENTION

In view of the foregoing issues, one object of the present invention is to provide a device and method for removing the mosquito noise. The device and method are capable of adaptively determining a proper strength for removing the mosquito noise according to an image complexity, thereby removing the noise while maintaining the quality of image details.

A device for removing mosquito noise is provided. The device comprises a buffer, a lookup table, a strength determining unit, a noise reduction circuit and a blending unit. The buffer receives an input image signal and temporarily stores a pixel matrix associated with a target pixel. The lookup table stores a plurality of strength coefficients. The strength determining unit, coupled to the buffer and the lookup table, detects a first image complexity and a second image complexity of the pixel matrix, and looks up the lookup table according to the first image complexity and the second complexity, thereby outputting a strength coefficient for removing the mosquito noise. For example, the pixel matrix comprises a first pixel matrix and a second pixel matrix, the first image complexity and the second image complexity are associated with the first pixel matrix and the second pixel matrix respectively, and the target pixel is the center pixel of the first pixel matrix and the second pixel matrix greater than the first pixel matrix. The noise reduction circuit performs noise reduction on the input image signal, so as to output an adjusted pixel corresponding to the target pixel. The blending unit, coupled to the noise reduction circuit and the strength determining unit, blending the target pixel and the adjusted pixel according to the strength coefficient for removing the mosquito noise, so as to generate an output pixel.

A method for removing mosquito noise is provided. The method comprises steps of detecting a first image complexity and the second complexity of pixel matrix associated with a target pixel, and determining a strength coefficient, for removing the mosquito noise, corresponding to the target pixel, according to the first image complexity and the second image complexity of the pixel matrix. For example, the pixel matrix comprises a first pixel matrix and a second pixel matrix, the first image complexity and the second image complexity are associated with a first pixel matrix and a second pixel matrix respectively, and the target pixel is the center pixel of the first pixel matrix.

DETAILED DESCRIPTION OF THE PREFERRED EMBODIMENT

Figure 1:
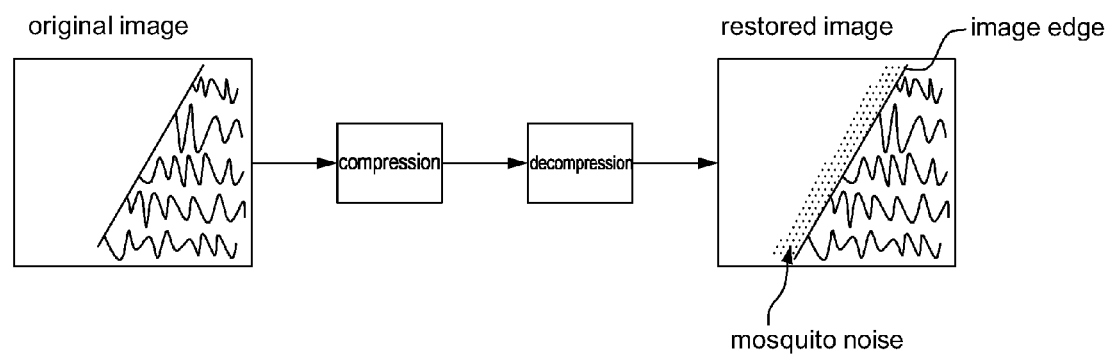
FIG. 1 is a schematic diagram of mosquito noise resulted from image compression and decompression.
Figure 2:
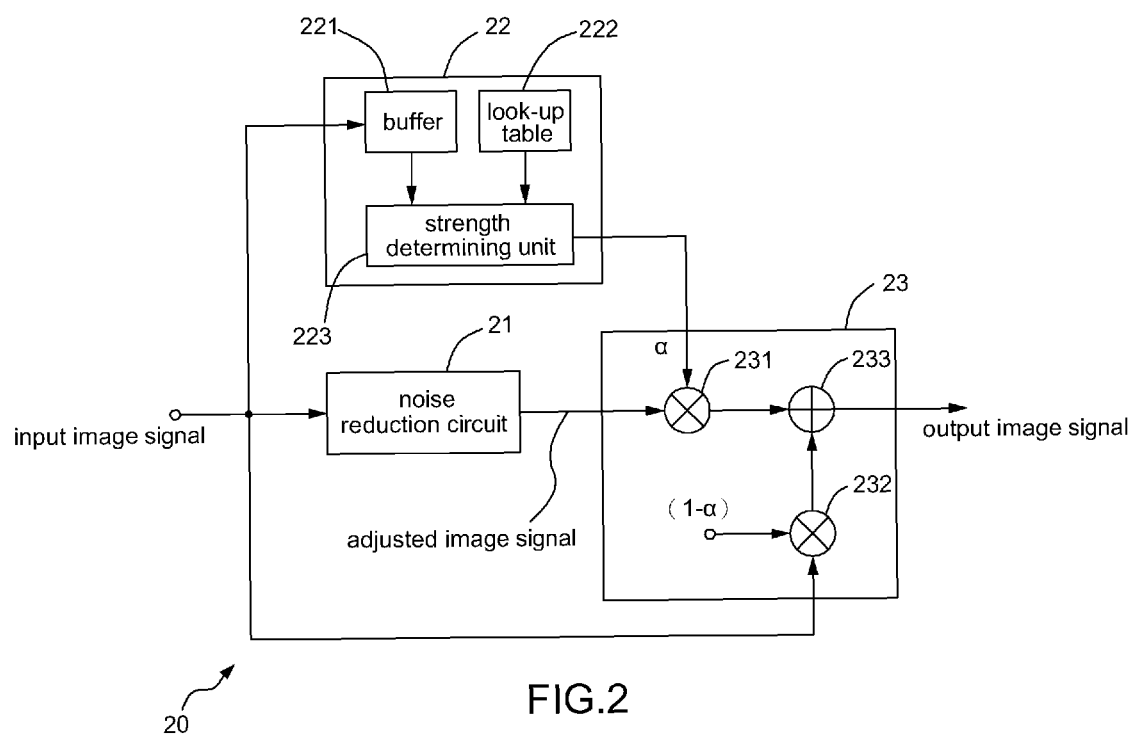
FIG. 2 is a block diagram of a device for removing mosquito noise in accordance with a preferred embodiment of the present invention.

FIG. 2 is a block diagram of a device 20 for removing the mosquito noise in accordance with a preferred embodiment of the present invention. The device 20 comprises a noise reduction circuit 21, a strength controller 22, and a blending unit 23. Since removing the mosquito noise may also damage image details, the device 20 adaptively determines a strength for removing the mosquito noise according to content of an image block having the mosquito noise, thereby removing the mosquito noise while maintaining the quality of the image details. The strength controller 22 comprises a buffer 221, a lookup table 222, and a strength determining unit 223. The buffer 221 temporarily stores a first pixel matrix and a second pixel matrix from an input image signal. The first pixel matrix and the second pixel matrix represent a part of the image respectively, and both of the first and the second pixel matrixes comprise a same target pixel such as a center pixel of the matrix. Preferably, the second pixel matrix is greater than and comprises the first pixel matrix. For example, the first pixel matrix is a 3×3 matrix having 9 pixels, and the target pixel is the center pixel of the matrix; the second pixel matrix is a 17×3 matrix having 51 pixels, and its target pixel is also the center pixel of the matrix. The size of the first and second pixel matrixes and the selection on the target pixel may vary according to practical requirements. The lookup table 222 stores a plurality of strength coefficients. The strength determining unit 223 detects the image complexities of the first pixel matrix and the second pixel matrix respectively, and it determines a strength coefficient corresponding to the target pixel according to the lookup table 222. The strength determining unit 223 determines the strength coefficient corresponding to each of the pixels in the input image signal for the blending unit 23, which shall be described in detail in the following description.

The first pixel matrix and the second pixel matrix can be implemented by memory windows. Different ranges of pixels associated with the target pixel in the image can be referenced by the memory windows. For example, the first pixel matrix covers pixels in a smaller range surrounding the target pixel, and the second pixel matrix covers pixels in a larger range surrounding the target pixel. Furthermore, based on the image complexities of the first and the second pixel matrixes, it can determine whether the target pixel is in a flat area or a complex area of the image, and whether the target pixel is near high frequency image area. The image complexities of the first and second pixel matrixes can be detected in various manners. For example, the image complexity of the first pixel matrix is determined according to differences between an average value and the pixels in the first pixel matrix, e.g., the image complexity of the first pixel matrix is represented by a summation of absolute differences between the average value and the pixels of the first pixel matrix. The image complexity of the second pixel matrix is determined according to a difference between a greatest pixel value and a smallest pixel value of the second pixel matrix. With respect to detecting the image complexities of the first and second pixel matrix, a person having ordinary skill in the art can make various modifications.

For instance, the noise reduction circuit 21 filters the input image signal with a filter to remove the mosquito noise and to output an adjusted image signal. The adjusted image signal comprises the target pixel, which the mosquito noise has been removed, and is referred to as an adjusted pixel in the following description. The noise reduction circuit 21 can be implemented with a low-pass filter, such as a median filter, a mean filter, and so on.

The blending unit 23, coupled to the noise reduction circuit 21 and the strength controller 22, performs alpha blending to blend the input image signal with the adjusted image signal from the noise reduction circuit 21 according to a strength coefficient α produced by the strength controller 22, so as to generate an output image signal. Therefore, according to the strength coefficient α, the blending unit 23 performs the alpha blending to generate an output pixel. For instance, the blending unit 23 comprises multipliers 231, 232, and an adder 233. The multiplier 231 multiplies the adjusted pixel generated by the noise reduction circuit 21 with the strength coefficient α determined by the strength determining unit 22. The multiplier 232 multiplies the target pixel with a complementary coefficient (1−α). The adder 233 then adds outputs of the multiplier 231 and 232 to complete the alpha blending. Therefore, as greater the strength coefficient becomes, a larger ratio of the alpha blending the adjusted image signal occupies, i.e., when the input image signal occupies a smaller ratio, the mosquito noise is more inclined to be determined and removed, and hence the strength for removing the mosquito noise is higher. Conversely, as smaller the strength coefficient becomes, a smaller ratio of the alpha blending the adjusted image signal occupies, i.e., when the input image signal occupies a greater ratio, the status of the input image signal is more inclined to be maintained, and hence the strength for removing the mosquito noise is lower. It is to be noted that, the type of blending performed by the blending unit 23 is not limited to alpha blending, and a person having ordinary skill in the art shall appreciate there are various modifications of blending operations. Provided that the proportions of the input image signal and the adjusted image signal in the input image signal determined by the blending unit 23 are varied along with changes of the strength coefficient, various kinds of blending may be applied and are included within the scope of the invention.

How to determine the strength coefficient corresponding to the target pixel according to the image complexities of the first and second pixel matrixes is further disclosed below. In this embodiment, the first pixel matrix covers pixels in the smaller range surrounding the target pixel. Therefore, when the image complexity of the first pixel matrix is very high, it represents that the target pixel positions in the complex area of the image. When the image complexity of the first pixel matrix is very low, it represents that the target pixel positions in the flat area. In fact, the mosquito noise occurring at the image within the complex area does not look obvious, and may even enhance the image details. Thus, when the target pixel positions in the complex area, i.e., when the image complexity of the first pixel matrix is very high, the strength coefficient generated by the strength controller 22 is preferably lower in order to remove the mosquito noise while maintaining more image details.

When the target pixel positions in the flat area, the strength coefficient for removing the mosquito noise is further determined according to whether a high frequency image block such as the complex area or an edge of the image exists near the target pixel. The strength coefficient for removing the mosquito noise can be determined according to the image complexity of the second pixel matrix. Preferably, the second pixel matrix covers pixels in the larger range surrounding the target pixel. Therefore, when the image complexity of the first pixel matrix is low and the image complexity of the second pixel matrix is high, the target pixel is considered as being in the flat area from the perspective of the smaller range, but is considered as being in the flat area near the edge of the image from the perspective of the larger range since the complex area or the edge of the image exists near target pixel. With the target pixel being in the flat area adjacent to the edge of the image, the mosquito noise appears rather odd in the flat area of the image. Accordingly, a larger strength coefficient is introduced to remove the mosquito noise, thereby preventing the mosquito noise from undesirably influencing a visual effect. When the image complexities of the first and second pixel matrix are low, it represents that the target pixel positions in the flat area and no complex area or image edges locate near the target pixel. No mosquito noise occurs or noise is low, a smaller strength coefficient is applied to generate a lower strength for removing the mosquito noise.

Furthermore, as the higher the image complexity of the first pixel matrix is, the lower the strength corresponding to the strength coefficient becomes. When the image block of the target pixel is more complex, the mosquito noise becomes less obvious. The strength for removing the mosquito noise is preferably lower to maintain more image details. When the image complexity of the first pixel matrix is lower, the correlation between the image complexity of the second pixel matrix and the strength coefficient becomes higher. In other words, when the image complexity of the first pixel matrix is lower, the strength for removing the mosquito noise is determined with greater dependency on the image complexity of the second pixel matrix.

Figure 3:
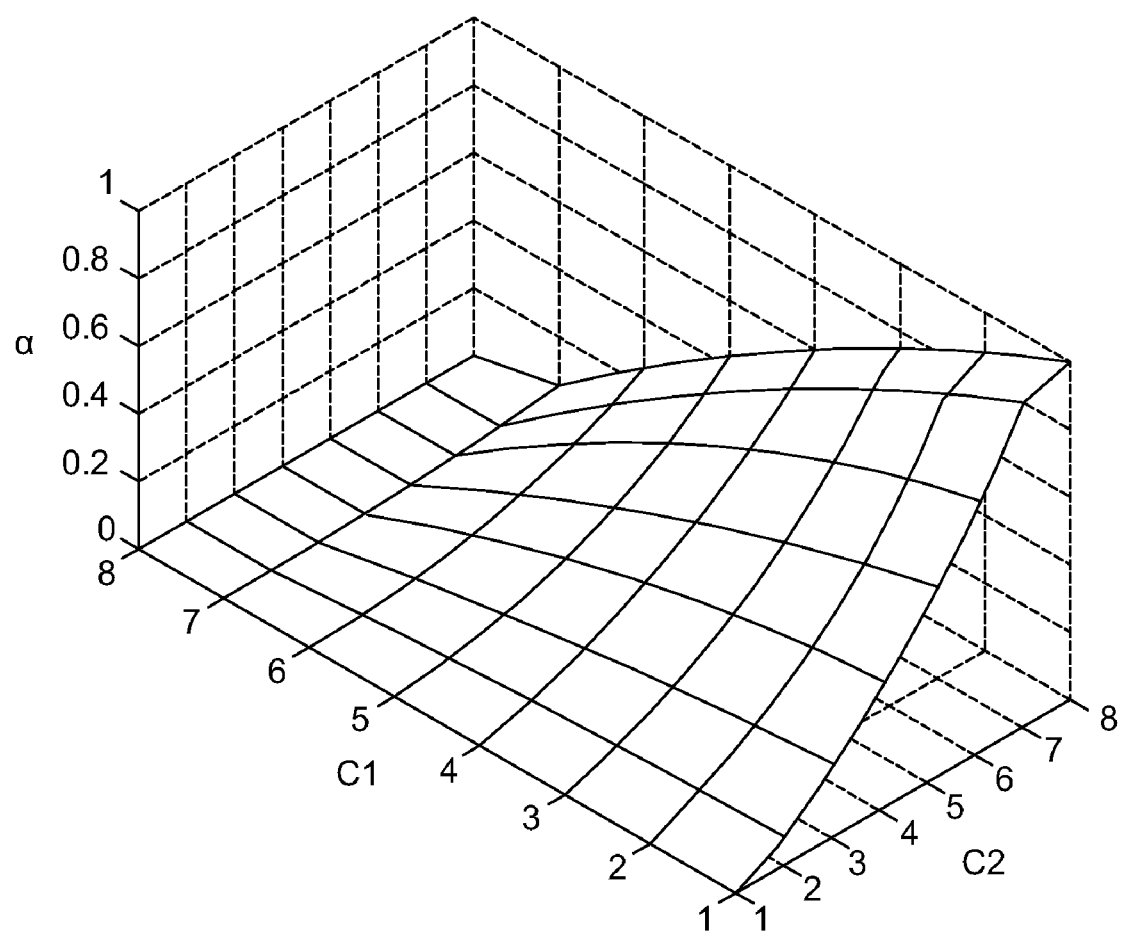
FIG. 3 showing a relationship between image complexities of a first pixel matrix and a second pixel matrix and a strength coefficient for removing mosquito noise in accordance with an embodiment of the present invention.

Referring to FIG. 3, in this embodiment, x axis and y axis respectively represent image complexities C1 and C2 of the first and the second pixel matrix, both ranging from 1 to 8. Z axis represents a strength coefficient α ranging from 0 to 1. When C1 becomes higher, α becomes lower. When C1 becomes lower, α becomes higher according to the change of C2, indicating that the correlation between C2 and a becomes larger.

The lookup table 222 can be provided according to FIG. 3. For example, the lookup table 222 is two dimensional. The horizontal and vertical variables respectively represent values of C1 and C2. Therefore, the strength determining unit 223 looks up a corresponding strength coefficient α from the lookup table 222 via a pair of C1 and C2. Interpolation can be applied to save hardware cost for the lookup table 222. Alternatively, the lookup table 222 can be provided outside the strength controller 22.

Figure 4:
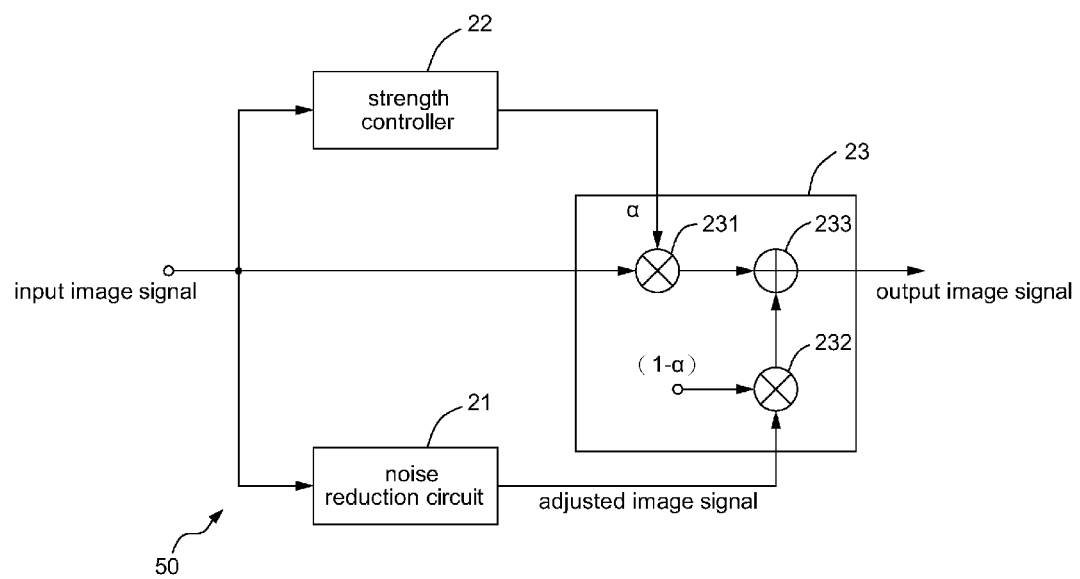
FIG. 4 is a block diagram of a device for removing mosquito noise in accordance with another preferred embodiment of the present invention.

FIG. 4 is a block diagram of a device 40 for removing mosquito noise in accordance with another embodiment of the present invention. The device 40 comprises similar components as the device 20 of FIG. 2 but different connections. Referring to FIG. 4, in the alpha blending performed by the blending unit 23, the input image signal is directly multiplied with the strength coefficient α generated by the strength controller 22, and the adjusted image signal generated by the noise reduction circuit 21 is multiplied with (1−α). Therefore, a device 40 for removing the mosquito noise adjusts the respective proportions of the adjusted image signal and the input image signal to produce the output image signal by adjusting the strength coefficient α, so as to remove the mosquito noise. It is to be noted that, in the embodiment of FIG. 2, the strength coefficient α is directly proportional to the corresponding strength for removing the mosquito noise. In the embodiment of FIG. 4, the strength coefficient α is inversely proportional to the corresponding strength for removing the mosquito noise. Thus, the mosquito noise is removed while the image details are maintained according to the present invention.

Figure 5:
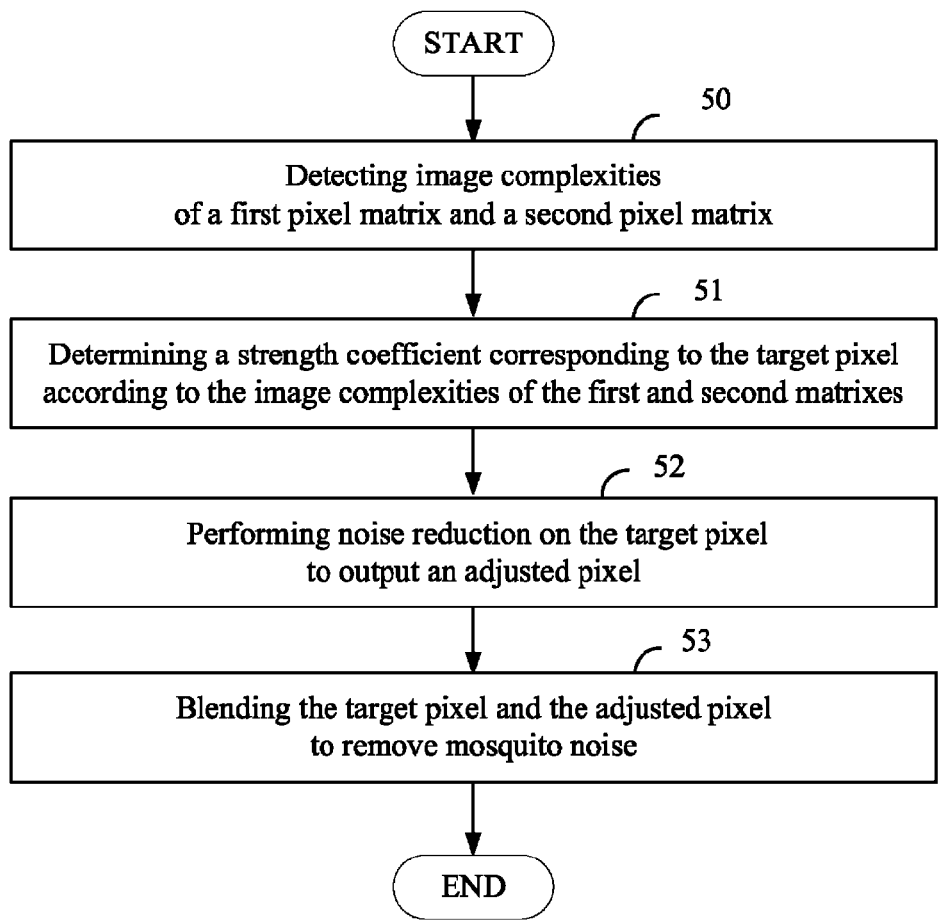
FIG. 5 is a flow chart of a method for removing mosquito noise in accordance with a preferred embodiment of the present invention.

FIG. 5 is a flow chart of a method for removing mosquito noise in accordance with a preferred embodiment of the present invention. In Step 50, image complexities of a first pixel matrix and a second pixel matrix are detected respectively. The first and second pixel matrixes associate with portions of an image respectively while the first and second pixel matrixes comprise a same target pixel. Preferably, the second pixel matrix is greater and comprises the first pixel matrix. The image complexity of the first pixel matrix is determined according to differences between an average value and the pixels in the first pixel matrix. For example, the image complexity of the first pixel matrix is represented by a summation of absolute differences between the average value and the pixels of the first pixel matrix. The image complexity of the second pixel matrix is determined according to a difference between a greatest pixel value and a smallest pixel value of the second pixel matrix.

In Step 51, a strength coefficient corresponding to the target pixel is determined according to the image complexities of the first and second matrixes. For example, a two dimensional lookup table stores a plurality of strength coefficients, and the image complexities of the first and second matrixes serve as an index for looking up the lookup table.

When the image complexity of the first pixel matrix becomes higher, the strength corresponding to the strength coefficient for removing the mosquito noise becomes lower. When the image complexity of the first pixel matrix becomes lower, the correlation between the image complexity of the second pixel matrix and the strength for removing the mosquito noise becomes larger. Preferably, when the image complexity of the first pixel matrix is low and the image complexity of the second pixel matrix is high, the strength coefficient corresponds to a high strength is selected. When the image complexities of the first and second pixel matrixes are low, the strength coefficient corresponds to a low strength is selected.

In Step 52, perform noise reduction to generate an adjusted pixel. For example, the input image signal is low-pass filtered to output an adjusted pixel by removing the mosquito noise on the target pixel.

In Step 53, blend the target pixel and the adjusted pixel to generate an output pixel to remove mosquito noise. The ratios of the input image signal and the adjusted image signal in the input image signal are determined by the strength coefficient.

In conclusion, a device for removing mosquito noise is provided according to the present invention. The device comprises a buffer, a lookup table, a strength determining unit, a noise reduction circuit and a blending unit. The buffer receives an input image signal and temporarily stores a pixel matrix associated with a target pixel. The lookup table stores a plurality of coefficients. The strength determining unit, coupled to the buffer and the lookup table, detects a first image complexity and a second image complexity of the pixel matrix, and looks up the lookup table according to the first image complexity and the second complexity, so as to output a strength coefficient from the stored coefficients. For example, the pixel matrix comprises a first pixel matrix and a second pixel matrix, the first image complexity and the second image complexity are associated with the first pixel matrix and the second pixel matrix respectively, and the target pixel is the center pixel of the first pixel matrix and the second pixel matrix greater than the first pixel matrix. The noise reduction circuit performs noise reduction on the input image signal to output an adjusted pixel corresponding to the target pixel. The blending unit, coupled to the noise reduction circuit and the strength determining unit, blending the target pixel and the adjusting pixel according to the strength coefficient to generate an output pixel.

A method for removing mosquito noise is provided. The method comprises steps of detecting a first image complexity and the second complexity of pixel matrix associated with a target pixel, and determining a strength coefficient according to the first image complexity and the second image complexity of the pixel matrix. For example, the pixel matrix comprises a first pixel matrix and a second pixel matrix, the first image complexity and the second image complexity are associated with a first pixel matrix and a second pixel matrix, and the target pixel is the center pixel of the first pixel matrix and the second pixel matrix greater than the first pixel matrix.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A device for removing mosquito noise, comprising:
    a buffer, for receiving an input image comprising a pixel matrix, and storing said pixel matrix, wherein said pixel matrix comprises a first matrix and a second matrix, and both said first matrix and said second matrix include a target pixel;
    a memory, for storing a plurality of coefficients;
    a strength determining unit, coupled to said buffer and said memory, for detecting a first image complexity of said first matrix and a second complexity of said second pixel matrix, and for selecting a first strength coefficient from said plurality of coefficients stored in the memory according to said first image complexity and said second image complexity; and
    a noise reduction circuit, for performing noise reduction on the input image and generating an adjusted image; and
    a blending unit, coupled to the noise reduction circuit and the strength determining unit, for blending an input pixel of said input image and an adjusted pixel of said adjusted image according to said first strength coefficient to generate an output image.

2. The device for removing mosquito noise as claimed in claim 1, wherein the noise reduction circuit is a low-pass filter.

3. The device for removing mosquito noise as claimed in claim 1, wherein the blending unit performs an alpha-blending to combine the input image and the adjusted image according to the first strength coefficient to generate the output image.

4. The device for removing mosquito noise as claimed in claim 1, wherein when the first image complexity is higher, the first strength coefficient is lower.

5. The device for removing mosquito noise as claimed in claim 1, wherein said first image complexity is determined according to a summation of differences between an average value and pixel values of said first matrix.

6. The device for removing mosquito noise as claimed in claim 5, wherein said second matrix is greater than said first matrix.

7. The device for removing mosquito noise as claimed in claim 6, wherein the second image complexity is determined according to a difference between a greatest pixel value and a smallest pixel value of the second matrix.

8. The device for removing mosquito noise as claimed in claim 6, wherein when said first image complexity is low, a correlation between said second image complexity and said strength coefficient is large.

9. The device for removing mosquito noise as claimed in claim 6, wherein when said first image complexity is low and said second image complexity is high, said strength coefficient is a high strength.

10. A method for removing mosquito noise, comprising:
   detecting a first image complexity of a first matrix, wherein said first matrix includes a target pixel;
   detecting a second image complexity of a second matrix, wherein said second matrix includes said target pixel
   determining a strength coefficient associated with said target pixel by looking up a lookup table according to said first image complexity and said second image complexity;
   receiving an input image signal, wherein said input image signal comprises a pixel matrix;
   storing temporarily said pixel matrix, wherein said pixel matrix comprises said first matrix and said second pixel matrix;
   generating an adjusted image by performing noise reduction on said input image signal; and
   blending an adjusted pixel of said adjusted image and an input pixel of said input image signal according to said strength coefficient to generate an output image.

11. The method as claimed in claim 10, wherein said noise reduction step low-pass filters the input image signal.

12. The method as claimed in claim 10, wherein when said first image complexity is high, said strength coefficient is low.

13. The method as claimed in claim 10, wherein said first image complexity is determined according to a summation of absolute values of differences between an average value and pixel values of said first matrix.

14. The method as claimed in claim 13, wherein said second matrix is greater than said first matrix.

15. The method as claimed in claim 13, wherein said second image complexity is determined according to a difference between a greatest pixel value and a smallest pixel value of said second matrix.

16. The method as claimed in claim 10, wherein when said first image complexity is low, a correlation between said second image complexity and said strength coefficient is large.

17. The method as claimed in claim 10, wherein when said first image complexity is low and said second image complexity is high, said strength coefficient is high.

* * * * *